US012624588B2

(12) United States Patent
Zullo et al.

(10) Patent No.: US 12,624,588 B2
(45) Date of Patent: May 12, 2026

(54) BARRIER

(71) Applicant: CLD Fencing Systems Limited, Cheshire (GB)

(72) Inventors: Giulian Zullo, Cheshire (GB); Russell Wells, Cheshire (GB); Vernon Wells, Cheshire (GB)

(73) Assignee: CLD Fencing Systems Limited, Cheshire (GB)

( * ) Notice: Subject to any disclaimer, the term of this patent is extended or adjusted under 35 U.S.C. 154(b) by 0 days.

(21) Appl. No.: 18/895,070

(22) Filed: Sep. 24, 2024

(65) Prior Publication Data

US 2026/0085566 A1 Mar. 26, 2026

(51) Int. Cl.
*E05F 15/63* (2015.01)
*E06B 11/02* (2006.01)

(52) U.S. Cl.
CPC ............ *E05F 15/63* (2015.01); *E06B 11/022* (2013.01); *E05Y 2400/30* (2013.01); *E05Y 2400/32* (2013.01); *E05Y 2400/452* (2013.01); *E05Y 2400/614* (2013.01); *E05Y 2400/616* (2013.01); *E05Y 2400/628* (2013.01); *E05Y 2400/66* (2013.01); *E05Y 2900/402* (2013.01)

(58) Field of Classification Search
CPC ............................... E01F 13/06; E06B 11/022
See application file for complete search history.

(56) References Cited

U.S. PATENT DOCUMENTS

| | | | | |
|---|---|---|---|---|
| 2,842,876 A * | 7/1958 | Chicoine | G07B 15/04 194/902 |
| 3,975,861 A * | 8/1976 | Baump | E01F 13/06 49/28 |
| 4,333,268 A * | 6/1982 | Dumbeck | E01F 13/04 49/34 |
| 4,848,175 A * | 7/1989 | Weiss | E01F 13/06 49/340 |
| 5,440,838 A | 8/1995 | Lesser | |
| 6,025,685 A * | 2/2000 | Parsadayan | E05F 15/643 318/471 |
| 6,935,000 B1 * | 8/2005 | Arnaud | E06B 11/04 16/DIG. 7 |

(Continued)

FOREIGN PATENT DOCUMENTS

| | | | |
|---|---|---|---|
| AU | 2015101178 A4 * | 10/2015 | E01F 13/06 |
| CN | 205088595 U | 3/2016 | |

(Continued)

OTHER PUBLICATIONS

Great Britain Patent Application No. 2304787.1 filed Mar. 31, 2023. First named inventor: Zullo. Combined Search and Examination Report dated Oct. 2, 2023, 6 pages.

(Continued)

*Primary Examiner* — Catherine A Kelly
(74) *Attorney, Agent, or Firm* — Santangelo Law Offices, P.C.

(57) ABSTRACT

Embodiments of the present application include a barrier system to control access including but not limited to a body, an arm, an actuator, a power source which may not be connected to mains power, a controller, or the like. The controller may be configured to instruct the actuator to move the arm reversibly between closed and open positions.

18 Claims, 9 Drawing Sheets

(56) References Cited

U.S. PATENT DOCUMENTS

| | | | | |
|---|---|---|---|---|
| 7,356,966 | B2 * | 4/2008 | Burke | E01F 13/06 49/49 |
| 7,816,879 | B2 * | 10/2010 | Taheri | H02K 7/116 318/266 |
| 7,818,920 | B2 * | 10/2010 | Causey | E01F 13/06 49/49 |
| 9,085,926 | B2 * | 7/2015 | Collinson | E05D 15/264 |
| 9,098,954 | B1 * | 8/2015 | Byrd | G01S 3/04 |
| 9,212,521 | B2 * | 12/2015 | McCarty | E05F 15/73 |
| 10,208,440 | B1 * | 2/2019 | Honeycutt | E05F 15/63 |
| 12,146,278 | B2 * | 11/2024 | Yeh | E01F 13/06 |
| 2017/0370144 | A1 | 12/2017 | Gall | |
| 2019/0019408 | A1 | 1/2019 | Beaulieu | |
| 2020/0056415 | A1 * | 2/2020 | Mittermeyer | E05F 15/63 |
| 2021/0002835 | A1 * | 1/2021 | Adler | H05B 47/196 |

FOREIGN PATENT DOCUMENTS

| | | | | | |
|---|---|---|---|---|---|
| CN | 106088995 | A | * | 11/2016 | G08B 13/08 |
| CN | 108570948 | A | * | 9/2018 | E01F 13/06 |
| CN | 111962427 | A | * | 11/2020 | E01F 13/06 |
| DE | 202023103958 | U1 | * | 7/2023 | E06B 11/025 |
| EP | 4206435 | A1 | * | 7/2023 | H02J 9/005 |
| GB | 2404413 | A | | 2/2005 | |
| GB | 2585068 | A | * | 12/2020 | E01F 13/06 |
| KR | 20220112464 | A | * | 8/2022 | E01F 13/06 |

OTHER PUBLICATIONS

United Kingdom Patent Application No. GB2304787.1, filed Mar. 31, 2023. First named inventor: Zullo. Examination Report dated Apr. 30, 2025, 2 pages.

* cited by examiner

BARRIER

BACKGROUND OF THE INVENTION

Barriers may be used to control the movement of traffic, people or other things. They are often used to control access to a location.

Barriers typically have an arm which may be moved between a closed position and an open position. In the closed position vehicles or people are prevented from passing into or out of a location. In the open position, vehicles or people may pass freely into and out of the location.

The arm of these barriers is typically connected to a motor and a grid-based power source to power the motor. The motor moves the arm between the open and closed positions. There are however self-powered (also known as 'off-grid') barriers which are available. One such barrier is disclosed in GB2585068A. This barrier uses a solar panel to provide power to the motor which controls the barrier arm.

A problem with self-powered barriers is that they have a limited supply of power. This might be determined by the capacity of a battery used by the system or by the means of powering the system. For example, solar panels will have a limited ability to provide power due to constraints associated with their size and the light available at their location. The limited supply of power means that these types of self-powered barriers are unsuitable for certain locations in which the arm must be frequently moved between open and closed positions. Self-powered barriers are therefore generally unsuitable for high traffic locations.

BRIEF SUMMARY OF THE INVENTION

It is amongst the objects of the application to solve one or more of these problems. An object of this application may include an efficient barrier system that utilizes less energy and has a lower carbon footprint.

It is another object of this application to provide a barrier system that can be used off-grid but have adequate power supply.

Naturally, further objects, goals and embodiments of the application are disclosed throughout other areas of the specification, claims, and drawings.

DETAILED DESCRIPTION OF THE INVENTION

Figure 1:
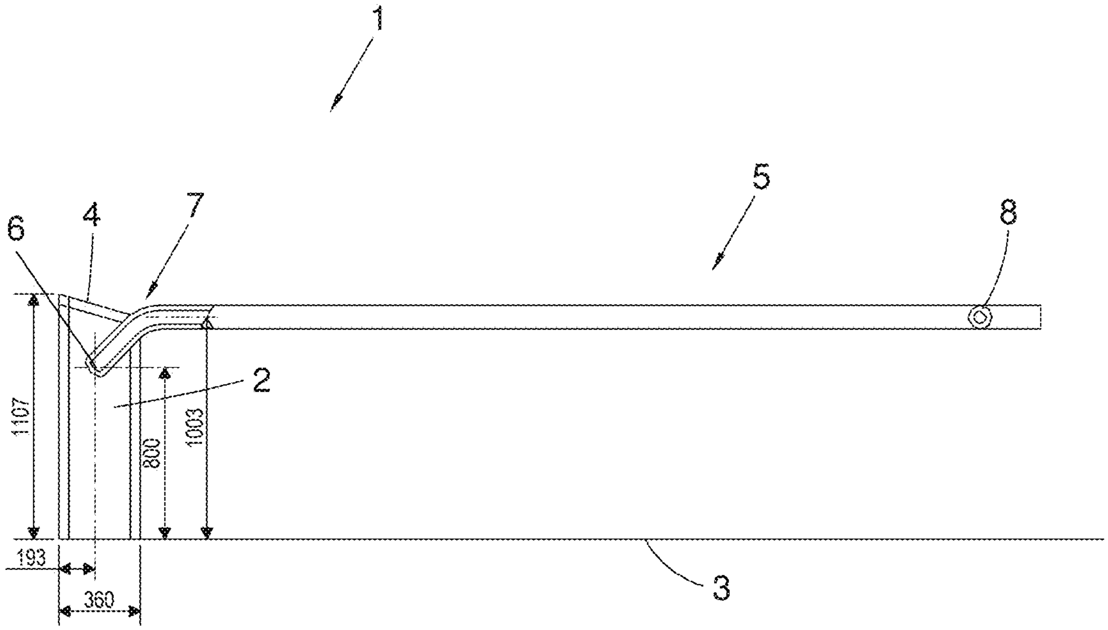
FIG. 1 shows a front view of a barrier in accordance with the present application.

It should be understood that embodiments include a variety of aspects, which may be combined in different ways. The following descriptions are provided to list elements and describe some of the embodiments of the application. These elements are listed with initial embodiments; however, it should be understood that they may be combined in any manner and in any number to create additional embodiments. The variously described examples and preferred embodiments should not be construed to limit the embodiments of the application to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In a first aspect the application provides a barrier according to claim 1.

In the closed position, the arm, once the barrier is installed, prevents vehicles, people, or other traffic from accessing a particular area. In the open position, the arm, once the barrier is installed, permits vehicles, people, or other traffic to access a particular area.

The power source may not be a battery or a simple energy storage device. The power source may be capable of generating, rather than just storing, power. The fact that the barrier may not be connected to mains power means that it may be installed in locations which are remote and off-grid. Even in locations where grid power is readily available, the present barrier is cheaper to install than mains-connected barriers because no cables are required to supply mains power. Those cables usually need to be buried below ground. The present application therefore provides a cheaply installed system, the carbon footprint of which is significantly lower than systems according to the prior art.

The actuator may comprise a motor, for example a rotary motor. The motor may be electric. The motor may be a brushless DC electric motor. These motors provide a low energy consumption, fast acceleration to maximum torque and high efficiency.

In some embodiments the arm is suitable for blocking a roadway. The arm may be adapted to move reversibly between horizontal (closed) and vertical (open) orientations. To move between its open and closed positions, the arm may pivot via a pivot which is adjacent to, or at, an end of the arm. The arm may be curved. The actuator may have a peak power consumption of about 65 watts or less during the raising of the arm. The actuator may have a peak power consumption of about 15 watts or less during the lowering of the arm.

There may be no step-up or step-down voltage conversion in the barrier's electronics. This improves the barrier's efficiency and reduces its energy consumption.

The body may be provided with attachment means, such as feet or apertures through which fasteners may be inserted, for securing a base of the body to a floor surface. The attachment means may be located at a base of the body. The base may be a base plate. The body may comprise a structure which supports the arm at a height above the ground which may be between about 0.9 m and about 1.2 m. The attachment means may be adapted for permanent engagement with a floor surface. The barrier may be permanently installed at a particular location.

The controller may have a standby power consumption of less than about 1 watt. In some embodiments the controller has a standby power consumption of less than about 5 watts.

The barrier may be provided with a planetary gearing system to transfer motion from the actuator (for example a motor) to the arm.

The controller may comprise or consist of an ARM-based chip architecture.

These low power consumption features enable the barrier to be installed at remote (off-grid), but high traffic, locations. They are particularly useful because they allow the power source to power the actuator over a high number of opening and closing cycles.

The arm may be provided with a light source which runs along some, or all, of its length, to alert vehicles to the presence of the arm. The light source may comprise an LED, and even an LED strip. The light source may have a pulsed mode. This provides an effective barrier with a low energy consumption. The barrier can therefore provide more open/close cycles in a given time period. The light sources may be provided on both sides of the arm, or only on one side of the arm.

The power source may be a renewable power source, for example a photovoltaic device or a wind turbine. The power source may be, or comprise, a solar panel.

In some embodiments, in particular those using a renewable power source, the barrier is able to complete at least about 2000 or at least about 3000 opening and closing cycles per day.

The controller may be configured to monitor the power consumption of the actuator and the position of the arm and adjust the amount of power provided by the power source to the actuator based on the position of the arm.

To move between its open and closed positions, the arm may pivot around a pivot point which is adjacent to an end of the arm, and wherein the controller may be configured to reduce power supplied to the actuator as the arm moves from the open position, in which the arm is generally vertical relative to the body, to the closed position, in which the arm is generally horizontal relative to the body. This helps to avoid unnecessary power being supplied to the barrier (when gravity assistance is sufficient to move the barrier) and improves its efficiency.

The controller may be configured to reduce the power supplied to the actuator as the arm moves from an angular position within the range about 90 to about 80° into an angular position in the range about 80 to about 0°, wherein an angular position of about 90° corresponds to a vertical orientation of the arm relative to the body and an angular position of about 0° corresponds to a horizontal orientation of the arm relative to the body. This helps to avoid unnecessary power being supplied to the barrier (when gravity assistance is sufficient to move the barrier) and improves its efficiency.

The controller may be adapted to reduce the power supplied to the actuator as the arm moves from an angular position within the range of about 80 to about 0° into an angular position in the range of about 90 to about 80°. This helps to avoid unnecessary power being supplied to the barrier (when the torque required to pivot the arm through the last portion of the raising is low) and improves its efficiency.

The horizontal and vertical orientations of the arm and the corresponding angular values associated with the positions of the arm may be defined with respect to a floor surface on which the body of the barrier is located. These positions and angles may also be defined with respect to the body or a base of the body, wherein the base is adapted to be located on a floor surface.

The actuator may comprise a transmission mechanism which actuates the arm such that acceleration and deceleration of the arm as it moves between open and closed positions and vice versa is generally sinusoidal.

This transmission mechanism may provide a gearing such that the torque required to lift the arm from about 0° (horizontal) is lower than the torque required to lift the arm from a position in which the arm has an angular position of greater than about 0°.

The adoption of the sinusoidal drive reduces the torque which the motor must produce at the start of the upward travel of the arm (highest load scenario). This provides an efficient movement of the arm and a lower power consumption, which lends itself well to solar (or other renewable) powered systems. The sinusoidal system may also assist with mechanical locking of the arm in the fully raised and/or the fully lowered positions.

The sinusoidal drive may cause the arm to accelerate upwardly creating a sinusoidal acceleration of the arm. The arm will continue to accelerate until reaching about a 45° position where the arm achieves its peak velocity. From about 45° to about 90° degrees the sinusoidal transmission may cause the arm to decelerate, thereby reducing the power required to bring the boom arm to a stop at about 90°. This may reduce power consumption and optimise overall efficiency.

A reverse of the mechanical acceleration and deceleration achieved during the lifting cycle of the barrier will take place during the lowering of the boom arm, i.e., the motor output shaft will reverse rotation and accelerate to maximum velocity whilst the transmission mechanism will generate a generally sinusoidal acceleration and deceleration of the arm for the lowering cycle.

The sinusoidal transmission allows a constant motor speed during both the lifting and lowering of the boom arm whilst automatically gearing the arm to accelerate, reach full speed, and then decelerate and stop.

The actuator may comprise a rotary motor and the transmission mechanism may comprise;

a lever which is coupled to the rotary motor, and a drive member which is attached to the arm, wherein the lever and the drive member are coupled such that when the motor rotates, the lever follows a rotary motion associated with the motor and drives the drive member in a rotary motion, and wherein the rotary motion of the lever and the rotary motion of the drive member are out of phase with one another. This provides an amplification of the torque provided by the actuator and a resulting generally sinusoidal acceleration of the arm. This avoids the need to adjust the speed of the actuator as the torque required to move the arm at various points throughout its motion changes, and avoids the resultant waste of energy that would otherwise occur.

To move between the open and closed positions, the arm may pivot around a pivot point which is adjacent to an end of the arm, wherein in the open position the arm is orientated generally vertically relative to the body, and in the closed position the arm is orientated generally horizontally relative to the body, and wherein the barrier may further comprise a compensator which is coupled to the arm such that when the arm is moved between the open and closed positions and vice versa, the compensator exerts a force on the arm which counteracts the force of gravity.

The compensator is used to balance the arm moment with an opposing moment. The lifting and lowering of the arm may be assisted by the connection of a mechanical compensator which acts on an arm yoke, providing mechanical resistance to gravity during the lowering of the boom arm, and mechanical assistance during the lifting of the arm. The compensator may comprise a spring.

The characteristics of the compensator, for example the force provided by the compensator may be adjustable, to enable the controller and actuator to experience a balanced load despite the effects of gravitational resistance during the lifting of the arm and gravitational assistance during the lowering of the arm. The effect of the balanced load is that the control is able to keep power consumption generally linear during the operation of the barrier. The compensator may also lower the peak torque required to move the arm or remove excessive peak torque. This can in turn reduce load on the actuator and improve energy efficiency.

The moment provided by the compensator may be within about 50 Nm and even within about 20 Nm of (but in the opposite direction to) the moment of the arm when the arm acts under gravity. The moment provided by the compensator may be within these ranges throughout the range of movement of the arm.

The power source may be adapted to charge battery. The battery may be adapted to supply power to the actuator.

In some embodiments the barrier further comprises a secondary body and wherein each of the body and the secondary body are provided with a detector unit, which detector units are adapted to communicate with one another and send an instruction to the controller.

In an installed configuration, the secondary body may be installed on an opposite side of a roadway or other thoroughfare to the body of the barrier. The detector unit may be formed from receiver and transmitter units. One of the receiver and the transmitter units may be positioned on the body and the other of the receiver and transmitter units may be provided on the secondary body. The transmitter and receiver units may comprise a photocell detector or an infra-red detector.

The detector units may be adapted to detect the presence of an obstruction in close proximity to, for example under, the arm. The obstruction may for example be a vehicle or a person. The detector units may be adapted to send a signal to the controller to indicate that an obstruction is present in close proximity, for example under, the arm, which signal is adapted to prevent the controller from instructing the arm to move from its open to its closed position. The signal may also be adapted to instruct the controller to stop a movement of the arm. The signal may also be adapted to instruct the controller to reverse the direction of movement of the arm. This can improve the safety of the arm by for example, preventing the arm from being lowered onto a vehicle or person which is positioned below the arm.

The detector units may be adapted to detect the presence of a person, vehicle or other object which is in close proximity to the barrier, even where that object is not causing an obstruction to the operation of the arm. The detector units may be adapted to send a signal to the controller to indicate that an object is present in close proximity to the arm, which signal is adapted to instruct the controller to move the arm between its open or closed positions.

The communication between the detector units may be wireless. Any suitable wireless communication device may be used, for example a Bluetooth® module.

The secondary body may be provided with a renewable power source to power the detector unit which is provided on the secondary body. The renewable power source may comprise a photovoltaic device such as a solar panel or a wind turbine. The secondary body may be provided with a battery. The battery may be chargeable by the renewable power source which is provided on the secondary body.

The secondary body may be provided with features which correspond to the features discussed herein in connection with the body.

The secondary body may be provided with a support for a distal end of the arm, which is adapted to support the arm in its closed position. This can reduce strain on the arm and actuator when the barrier is in its closed position.

The wireless communication between the detector units in combination with the renewable power source removes any requirement for cabling to be laid under a roadway or thoroughfare which runs between the body and the secondary body of the barrier. This reduces the cost of installation. It also removes the need to change a self-contained (but non-renewable) power source such as a battery. This reduces the maintenance burden on operators of the barrier.

The barrier may further comprise a secondary power source. The secondary power source may comprise a generator or a mains connection. The generator may be a petrol, diesel or hydrogen generator. The secondary power source provides a backup power source, which is particularly useful when the power source is a renewable power source.

The barrier may further comprise a battery, wherein the power source and the secondary power source are adapted to charge the battery and the battery is adapted to supply power to the actuator, and wherein the controller is configured such that the secondary power source only charges the battery when the battery is below a charge threshold. This ensures that the primary charging means is the power source rather than the secondary power source.

The secondary power source, such as a generator, may be provided with a stop-start function which is linked to the controller to switch the generator on and off in response to the charge level of the battery in an energy efficient manner. The secondary power source may be used to charge the battery when the charge of the battery drops below about 80%, about 70%, about 60%, about 55%, about 50%, about 40%, about 30%, about 20% or about 10%.

The barrier may comprise an input to receive a signal which prompts the controller to move the arm from the closed position to the open position or vice versa. The signal may be an electrical or electromagnetic signal from, for example, a vehicle or person sensor or a secondary module such as a ticket dispenser.

Embodiments of the application will now be described with reference to the figures.

FIG. 1 shows a barrier according to the present application. The barrier has a generally cuboid body 2, the height of which is greater than its width or depth. The body is located and permanently attached to a floor surface 3. A top surface of the body is planar and angled at around 15° to the horizontal. Attached to this top surface is a solar panel 4. An arm 5 extends from the body. The arm is pivotally connected to the body at the pivot point 6. The arm is generally straight over most of its length but has an elbow 7 adjacent to the body. The arm is shown in its horizontal (0°) orientation, however it can be raised and lowered by pivoting about the pivot point 6 at its proximal end. This will be shown in more detail in the following figures. The arm is provided with an LED 8 at its distal end to alert vehicle drivers to the position of the arm.

The floor surface 3 under the arm forms a roadway which provides access to a location, such as a car park.

Figure 2:
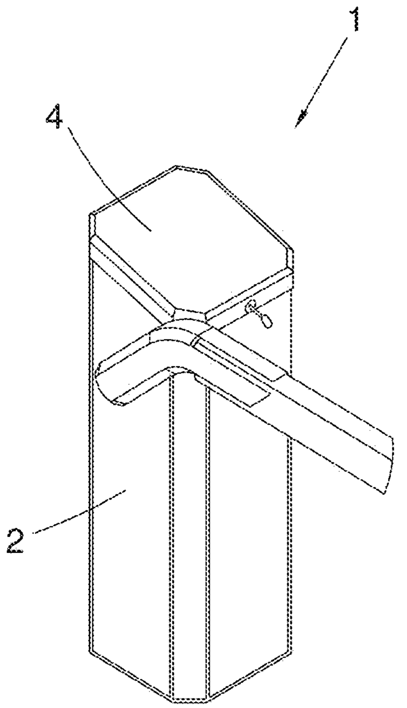
FIG. 2 shows a perspective view of a portion of the barrier shown in FIG. 1.

FIG. 2 shows a portion of the barrier 1. The solar panel 4 is more easily visible on the top surface of the body 2. In other embodiments the solar panel(s) may be located at a distance from the body 2 of the barrier (but retain an electrical connection to the barrier's electronic system). The solar panels may be freestanding or may be coupled to a nearby structure such as a roof.

Figure 3:
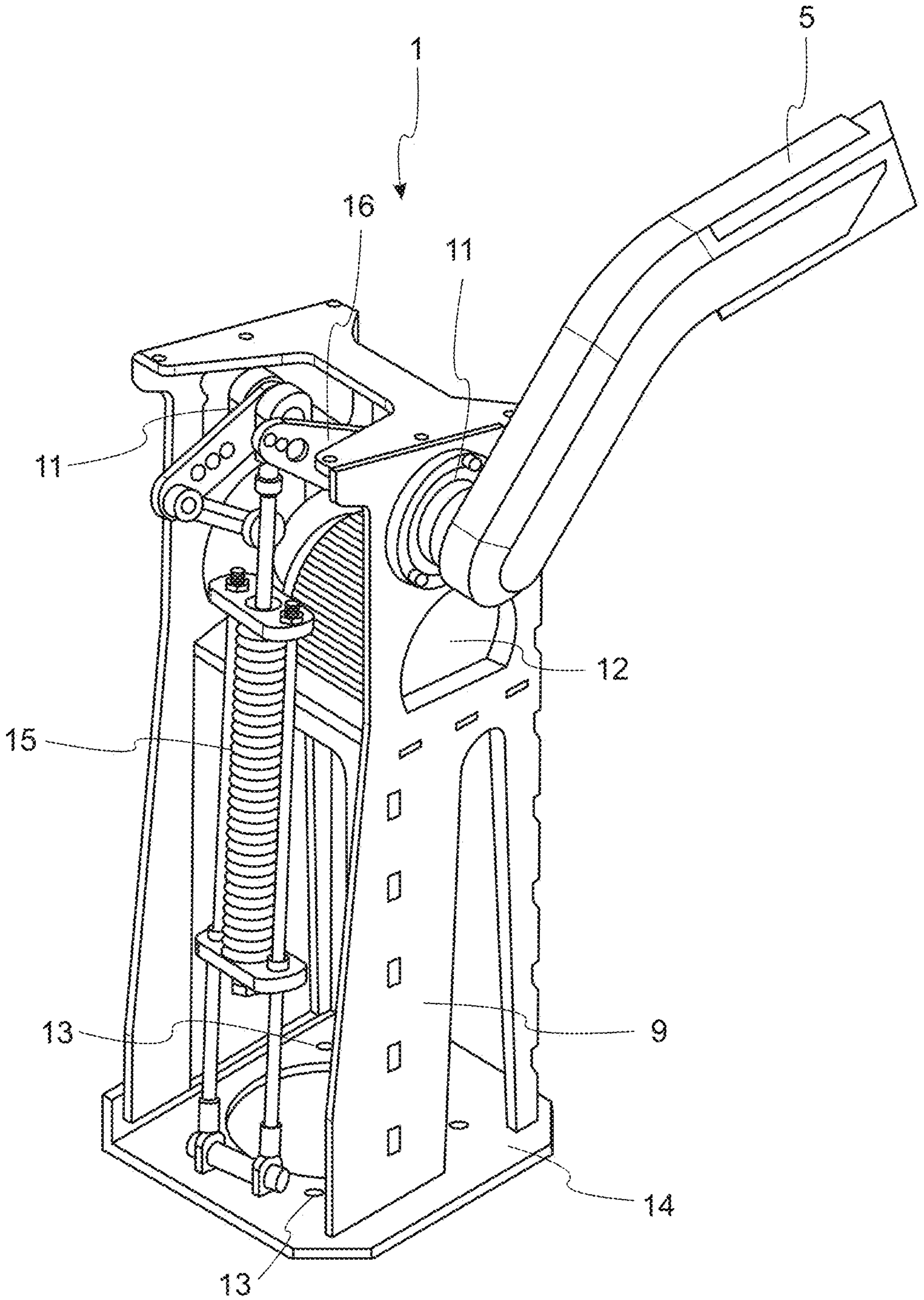
FIG. 3 shows a perspective view of a cut-away view of a portion of the barrier shown in FIG. 1.

FIG. 3 shows the internal workings of the barrier 1. A housing of the body and the solar panel have been removed to expose the support frame 9 which holds the arm 5 above the floor surface. The arm is attached at its end to a shaft 10 which is received by bearings 11. One bearing 11 is located in a cut-out in the support frame 9 and the other bearing 11 is attached to an opposing sidewall of the support frame. The support frame is provided with apertures 13 for permanently affixing the barrier to a floor surface. The apertures 13 are located in a base plate 14.

A brushless DC electric motor 12 is supported between the sidewalls of the support frame. The transmission mechanism for transmitting power from the motor to the arm is shown in detail in FIGS. 4-6.

The barrier is provided with a spring compensator 15. One end of the compensator is bolted to the base plate 14. The other end of the compensator is pivotally attached to a lever 16 which is connected to the shaft 10.

Figure 4:
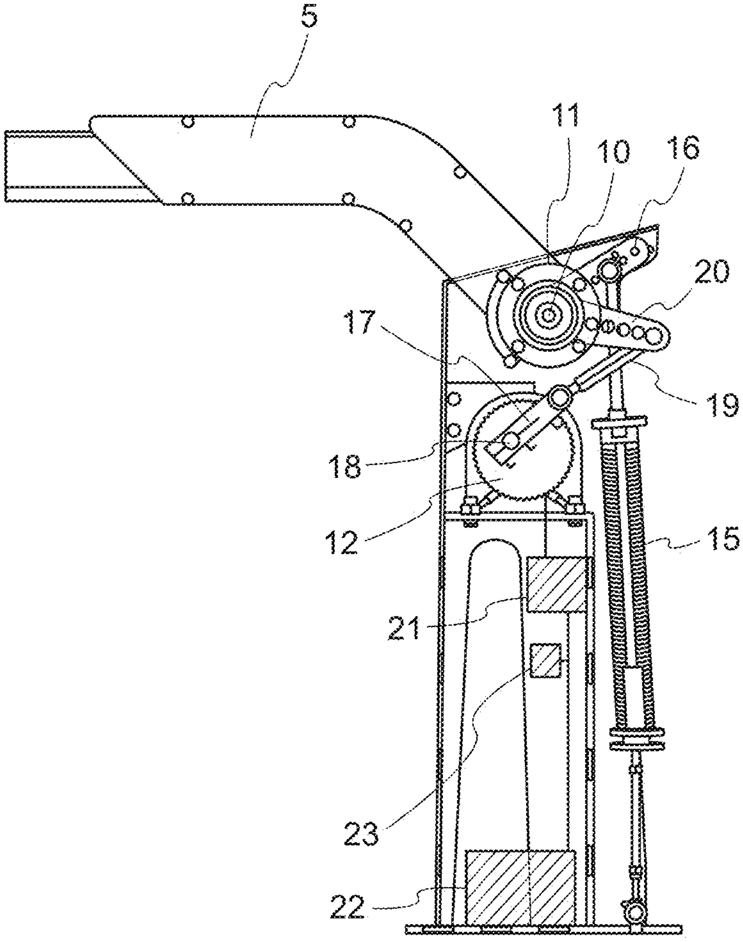
FIG. 4 shows a cross-sectional view of a portion of the barrier shown in FIG. 1, in which the arm is in a closed position.

FIG. 4 shows a cross sectional view of the barrier. The shaft 10 which supports the arm 5 and the bearing 11, which supports the shaft 10, are shown. The motor 12 is provided with a motor lever 17 which is pivotally coupled to the output shaft 18 of the motor such that the lever rotates with the motor. An end of the motor lever 17 which is distal to the output shaft of the motor, is attached to a first end of an adjustable connector rod 19. The length of the adjustable connector rod is adjustable. This can be used to adjust the resting height and angle of the arm 5. The adjustable connector rod is formed by a central portion which has a threaded connection to two threaded portions at either of its ends. The central portion may be twisted to advance or retract the amount of thread exposed and thereby adjust the length of the connector rod. A second end of the adjustable connector rod 19 is attached to a lever 20 which is connected to the shaft 10. The spring compensator 15 is shown attached to the lever 16, which is also attached to the shaft 10.

When the motor starts turning in a clockwise manner, the angle between the adjustable connector rod 19 and the lever 20 is acute. The initial motor power which will be required to move the arm from its horizontal position will therefore be lower than it would be it the lever 20 were perpendicular to the adjustable connector rod 19.

When an open/up cycle is initiated, the output shaft 18 of the motor will immediately accelerate to maximum velocity within less than 1 second with maximum torque immediately available. The geometry of the transmission mechanism (the motor lever 17, the adjustable rod connector 19 and the lever 20) effectively delays any large movements of the shaft 10 and thereby the lifting of the boom arm, despite the DC brushless motor output shaft already rotating at maximum velocity. As the motor output shaft 18 rotates, the transmission mechanism greatly reduces the initial power required (from the motor) to lift the boom arm from the fully lowered position, because the power of the motor is amplified by the geometry of the transmission mechanism.

The controller 21 is shown schematically in FIG. 4. This controller sends signals to the motor to start and stop the movement of the arm. The controller is electrically connected to a battery 22 and the solar panel 4 (shown in FIG. 1). The solar panel is electrically connected to the battery so that it can charge the battery. Other electrical components are provided in the box 23. These electrical components and the ones already described are shown in more detail in FIGS. 10-12.

Figure 5:
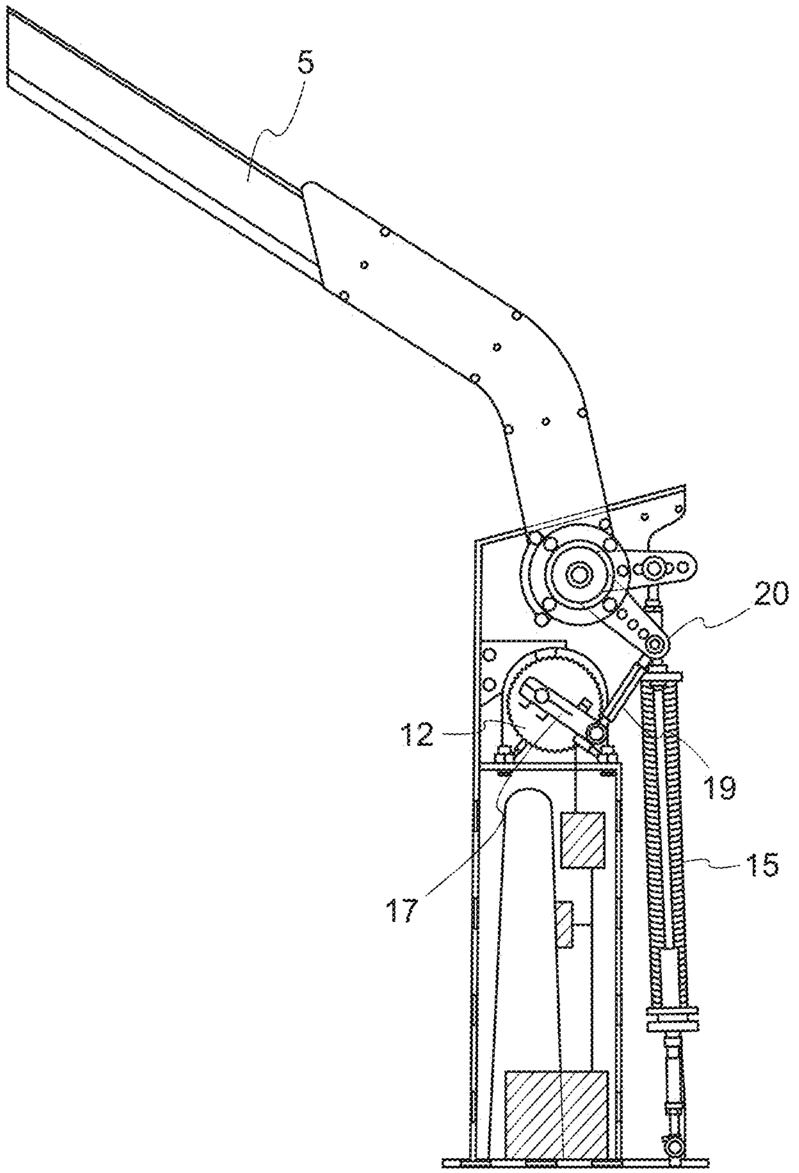
FIG. 5 shows a cross sectional-view of a portion of the barrier shown in FIG. 1, in which the arm is in an intermediate position between its closed and open positions.

FIG. 5 shows the arm 5, half way through the opening/closing movement. The arm is at an angle of about 45° to horizontal. The motor 12 has rotated such that the motor lever 17 and the lever 20 are parallel. This means that as the arm 5 is raised from the position shown in FIG. 4 to the one shown in FIG. 5, all of the power provided by the motor goes into lifting the arm without a mechanical gearing. The angular movement of the arm accelerates to reach the mid-point of the lift as less torque is required to effect a given angular movement. The spring in the spring compensator 15 contracts to assist with the lifting of the arm.

In other words, where the arm is horizontal and would require more torque to lift, the transmission arrangement amplifies the force provided by the motor, to ensure that the motor can be run at a low torque. This keeps the power consumption of the motor low and increases the number of cycles that the solar panel can power.

Figure 6:
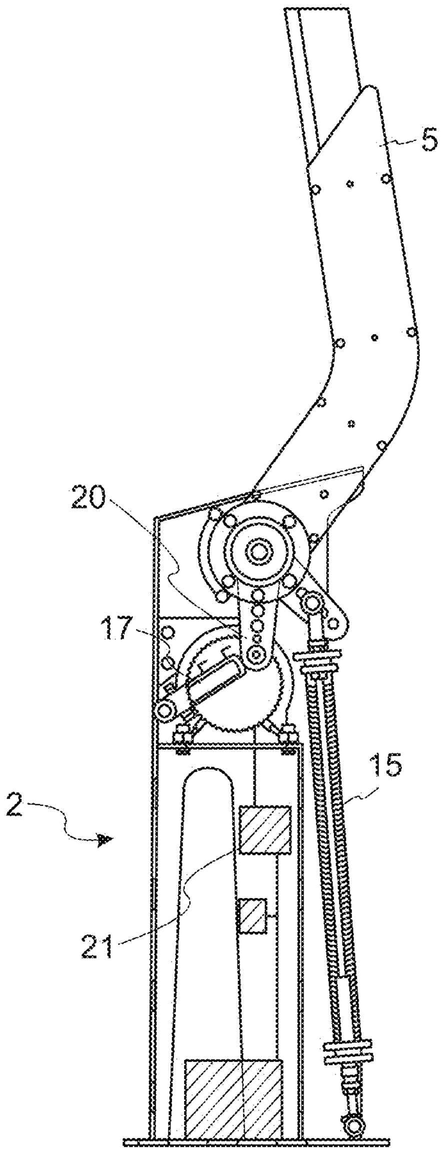
FIG. 6 shows a cross-sectional view of a portion of the barrier shown in FIG. 1, in which the arm is in an open position.

FIG. 6 shows the arm 5 in its open orientation, that is, generally vertical with respect to the body 2. Vehicles can therefore pass through the previously blocked roadway. The angle between the motor lever 17 and the lever 20 is obtuse. As the arm approaches this position the angular movement of the arm therefore decelerates. The contracted spring of the spring compensator 15 helps to retain the arm in its open orientation even when the motor is providing no driving force.

To return the arm to its closed orientation, the controller 21 sends a signal to the motor 12 to rotate it in the opposite direction to the one just described in the 'opening' movement.

Figure 7:
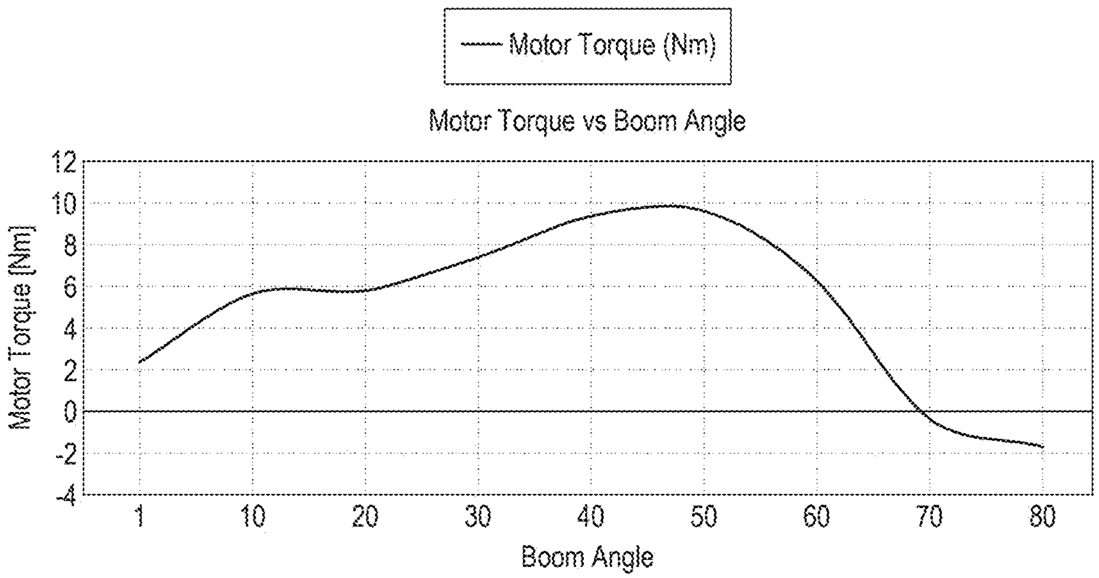
FIG. 7 shows a graph of motor torque vs arm (boom) angle for the barrier shown in FIG. 1.

FIG. 7 shows a graph of motor torque vs arm (boom) angle. This demonstrates the generally sinusoidal torque which is provided by the motor over the lifting/lowering of the arm. This generally sinusoidal profile is due to the use of the transmission mechanism which includes the motor lever 17, the adjustable connector rod 19 and the lever 20. The use of this arrangement avoids high demands on the motor in terms of torque, which provides an energy efficient system. The energy saving can be used to conduct a larger number of solar-powered opening/closing cycles than would otherwise be the case.

Figure 8:
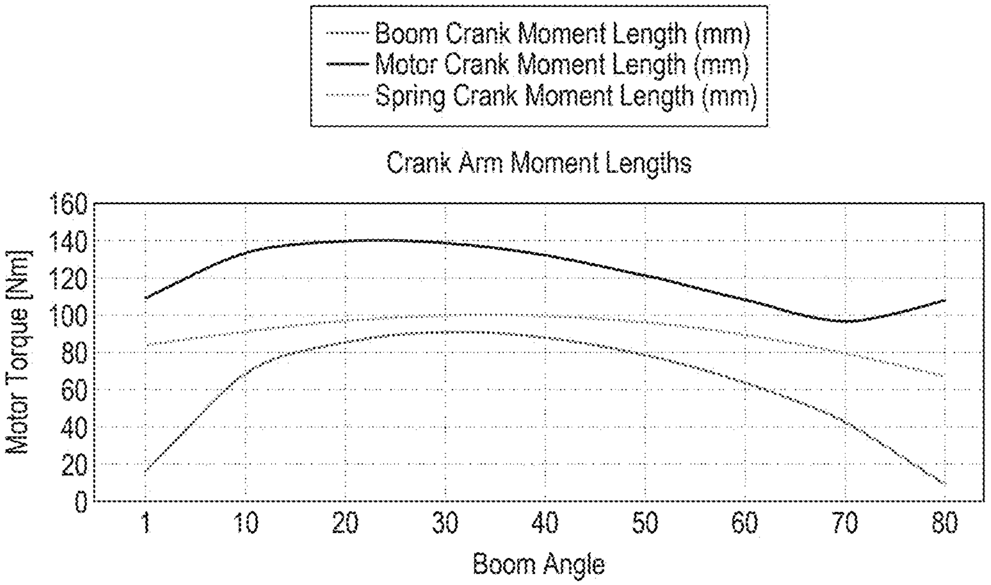
FIG. 8 shows a graph of crank arm moment length vs arm (boom) angle for the barrier shown in FIG. 1.

FIG. 8 shows the moment lengths in mm of the lever 20 (labelled as boom crank), the motor lever 17 (labelled as motor crank) and the lever 16 (labelled as the spring crank) and how their relative lengths vary over the lifting/lowering cycle.

Figure 9:
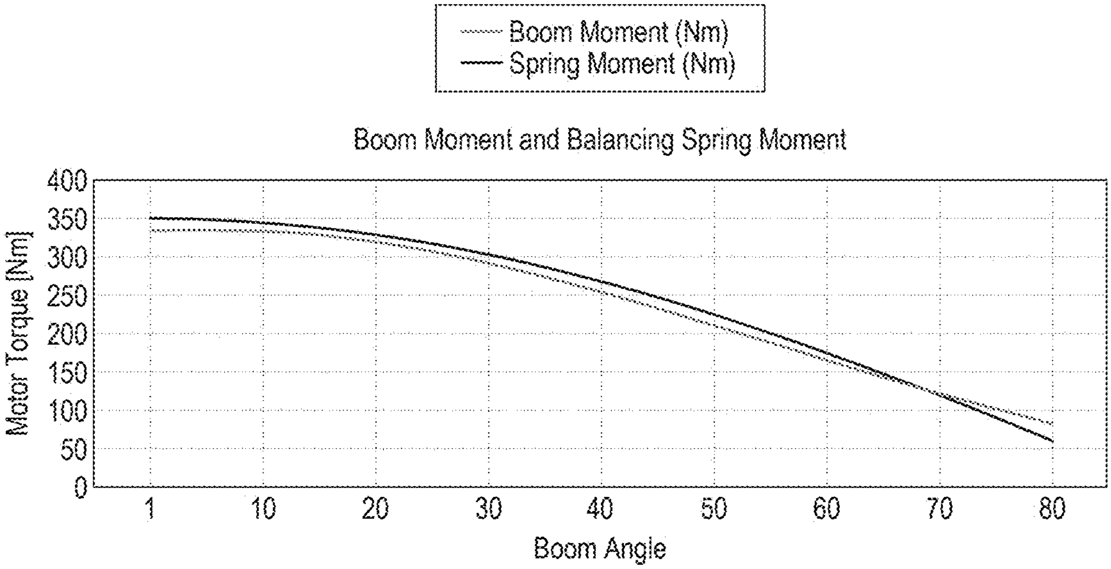
FIG. 9 shows a graph of arm (boom) moment and balancing spring moment vs arm (boom) angle for the barrier shown in FIG. 1.

FIG. 9 shows moment of the arm (labelled as the boom moment) compared to the moment provided by the spring in the spring compensator. These moments are actually in opposite directions. However, the graph shows that their magnitudes are similar and are not more than about 20 Nm different from one another at any point during the lifting/lowering movement. This assists in providing a smooth and balanced arm motion.

Figure 10:
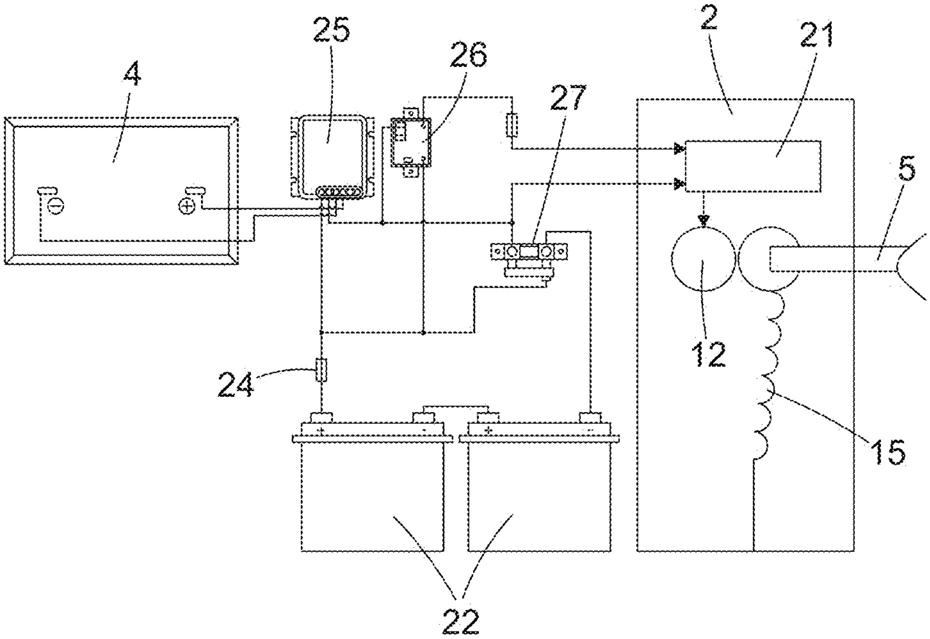
FIG. 10 shows an electrical diagram of a first embodiment of a self-powered barrier according to the application.

FIG. 10 shows a schematic of the electronic arrangement of the embodiment shown in FIGS. 1-9. The body 2 of the barrier, the arm 5, the spring compensator 15 and the electric motor 12 are also shown schematically. The battery 22 is made up of two battery units connected in series. These are two AGM® deep cycle 12V/165 Ah DC batteries. A 30-amp fuse 24 is present in line with the battery to protect the circuit from power surges. The solar panel 4 is connected to the batteries 22 via a solar charge controller 25. A smart battery protector 26 and a smart shunt 27 are included in the circuit to protect the batteries and distribute charge into and from the batteries. The smart shunt is a Victron Energy® smart shunt 500 A/50 mV. The solar panels are adapted to charge the batteries.

The controller 21 is connected to the battery and solar panel 4 circuit. The circuit provides a 24 V supply to the controller 21 and the motor 12. The controller is a microcontroller powered by an ARM architecture. The microcontroller is an Amtel® ARM microcontroller. The motor 12 is a brushless DC motor with a maximum power output of 80-120 W. The motor runs off a 24V supply. The solar charge controller 25 is a Victron Energy® Smart Solar MPPT 100/30 or 100/50. The solar panel 4 comprises two JA Solar® 340 W mono solar panels.

Figure 11:
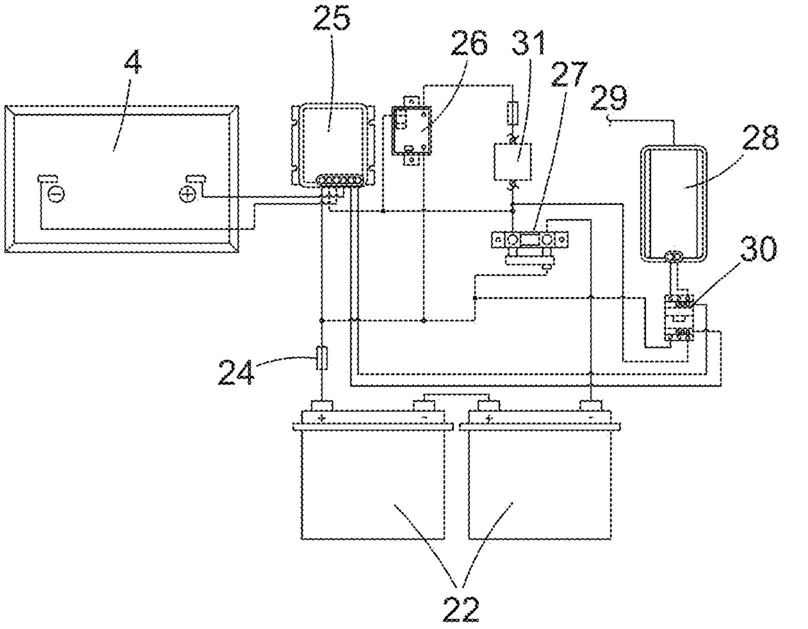
FIG. 11 shows an electrical diagram of a second embodiment of a hybrid-powered barrier.

FIG. 11 shows a different embodiment from FIG. 10, however similar components are labelled with the same numbers as in FIG. 10. The output of the circuit is shown as being delivered to the rest of the barrier components (motor, arm etc. not shown in this figure-refer to FIG. 10) by the schematic box 31.

The main difference is that the system is hybrid. Instead of the system relying solely on the solar panels 4 to charge the batteries 22, the system also has a mains 230V (or other relatively high voltage) connection 29 which is connected to the charger 28. The charger 28 converts the mains power into 24V and is electrically connected to the batteries 22 so that it can supply power to charge the batteries. The distributor 30 can monitor the charge level of the batteries and only supply power to the batteries 22 when the charge of the batteries drops below about 55%. This is intended to act as a back up way of charging the batteries when the solar panels alone are not providing enough power to charge the batteries. This is useful to ensure that functionality is preserved even during periods of exceptionally high use or at night time or other times when the solar panels are not able to provide enough charge to maintain the battery charge.

The distributor is adapted to switch off the battery charging via the mains connection 29 and charger 28 when the battery charge rises above about 55%. This ensures that solar powered charging is by default prioritized over mains charging.

Figure 12:
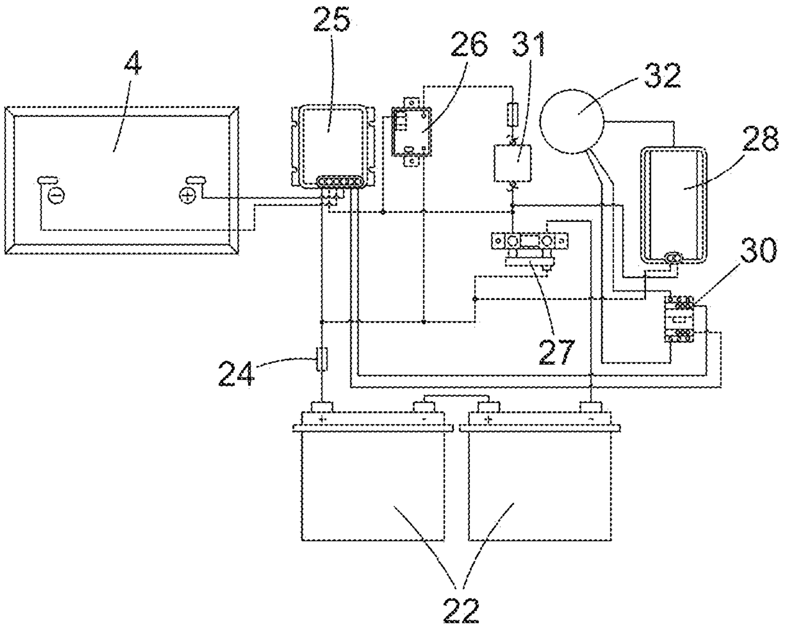
FIG. 12 shows an electrical diagram of a third embodiment of a hybrid-powered barrier system.

FIG. 12 shows a different embodiment from either of FIG. 10 or 11, however similar components are labelled with the same numbers as in FIGS. 10 and 11.

This embodiment has a hybrid power supply. It is provided with a generator 32 as well as the solar panels 4. The generator may be a petrol, diesel or hydrogen-powered generator. The generator is connected to the circuit via a charger 28 in the same way as is shown in FIG. 11. The charger converts the voltage output from the generator to an appropriate 24V to charge the batteries 22. The distributor 30 works in an analogous manner to the one shown in FIG. 11.

In all embodiments described, the controller is provided with control software which is coupled to the brushless DC motor to provide a closed loop of feedback whereby the controller can accurately monitor power consumption of the motor. This gives the control software the ability to monitor electrical power consumption during both the upward and downward travel of the arm and adjust the power which is supplied to the motor to avoid large peaks in power delivered. This approach allows the control software to significantly reduce power consumption over a conventional barrier during the cycle.

To lower the arm 5, the control software initially instructs the batteries 22 to supply the minimum amount of power required to generate sufficient torque to allow the arm to be driven from a generally vertical orientation to pass over an angular orientation of 85°, towards a lower/smaller angular position. From 80° degrees onwards the electrical power supplied to the motor is reduced so that gravity can assist the lowering of the arm. This reduces the power consumption during the downward cycle whilst keeping full control of the arm.

Figure 13:
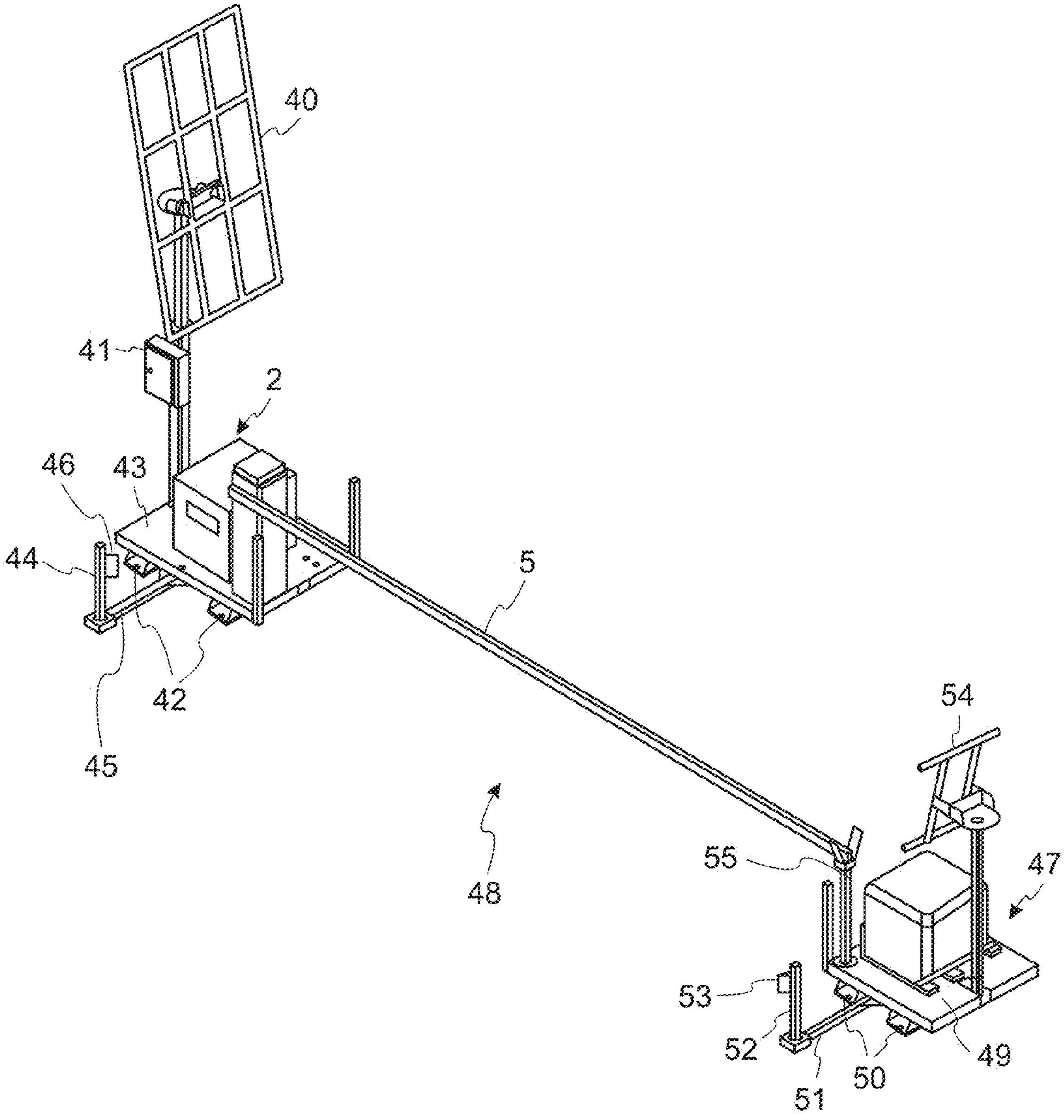
FIG. 13 shows another embodiment of a barrier according to the application.

FIG. 13 shows an embodiment of a barrier according to the application. The barrier comprises a body 2, and an arm 5. A rack 40 is provided for accommodating a solar panel to power a battery (not shown) contained within the body, which battery is adapted to power a controller which is accommodated in the box 41 and an actuator (not shown) which is housed inside the body 2. The workings of the actuator, arm and controller are generally the same as in the embodiments previously described. The body 2 comprises a base plate 43, to which are attached feet 42 for permanent attachment to a floor surface. An upstanding detector post 44 is attached to the base plate 43, such that the detector post is held a distance from the arm by a rigid spacer 45. A first detector unit 46 is provided adjacent to the upper end of the detector post 44.

A secondary body 47 is provided on the opposite side of a roadway 48 to the body 2. The secondary body 47 comprises a square metal base plate 49 which is provided with feet 50 which are adapted for permanent attachment with a floor surface. The secondary body is provided with a rigid spacer 51 which supports an upstanding detector post 52, such that the detector post is held a distance from the arm (when the arm is in its closed position (as shown). Adjacent to the top of the detector post 52 is a second detector unit 53. A battery (not shown) is provided inside the secondary body 47. The secondary body is provided with a rack 54 for accommodating a solar panel. Wiring and electronics are also provided to enable a solar panel located on the rack 54 to charge the battery. The second detector unit 53 and the first detector unit 46 comprise a photodetector and an infra-red beam generator. One of the units generates an infra-red beam and directs it towards the photodetector on the other of the detector units. When the photodetector detects an interruption in the infra-red beam caused by an obstruction or other object, it sends a signal to the controller in the box 41 which sends an instruction to the actuator. The instruction sent to the actuator may be to move the arm to between its open and closed positions, or to/from an intermediate position, or to stop or reverse a movement of the arm which has already been started. The solar panel on the secondary body 47 charges the battery of the secondary body so that the battery does not need to be replaced, and there is no need to dig up the roadway to lay cables to allow the secondary body components 47 to be powered by power coming from the first body 2.

The racks 40 and 54 for accommodating the solar panels are both independently moveable so that they can be independently adjusted (for example by adjusting their angle, orientation, or height) to best capture any natural light and charge the solar panels most effectively.

The secondary body is provided with a support 55 for a distal end of the arm 5. The support 55 comprises an upstanding post and supports the distal end of the arm when the arm is in its closed position.

As can be easily understood from the foregoing, the basic concepts of the various embodiments of the present invention(s) may be embodied in a variety of ways. It involves both barrier techniques as well as devices to accomplish the appropriate barrier. In this application, the barrier techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the various embodiments of the invention(s) and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the application is described in device-oriented terminology, each element of the device implicitly performs a function. Apparatus claims may not only be included for the device described, but also method or process claims may be included to address the functions of the embodiments and that each element performs. Neither the description nor the terminology is intended to limit the scope of the claims that will be included in any subsequent patent application.

It should also be understood that a variety of changes may be made without departing from the essence of the various embodiments of the invention(s). Such changes are also implicitly included in the description. They still fall within the scope of the various embodiments of the invention(s). A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of embodiments of the invention (s) both independently and as an overall system.

Further, each of the various elements of the embodiments of the invention(s) and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the various embodiments of the invention(s), the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which embodiments of the invention(s) is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "controller" should be understood to encompass disclosure of the act of "controlling"—whether explicitly discussed or not—and, conversely, were there effectively disclosure of the act of "controlling", such a disclosure should be understood to encompass disclosure of a "controller" and even a "means for controlling." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components, programming, subroutines, logic, or elements that are configured to, or configured and arranged to, provide or even achieve a particular result, use, purpose, situation, function, or operation, or as components that are capable of achieving a particular activity, result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the information statement filed with the application are hereby appended and hereby incorporated by reference, however, as to each of the above, to the extent that such information or statements incorporated by reference might be considered inconsistent with the patenting of the various embodiments of invention (s) such statements are expressly not to be considered as made by the applicant(s).

Thus, the applicant(s) should be understood to have support to claim and make claims to embodiments including at least: i) each of the barrier devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrases "comprising", "including", "containing", "characterized by" and "having" are used to maintain the "open-end" claims herein, according to traditional claim interpretation including that discussed in MPEP § 2111.03. Thus, unless the context requires otherwise, it should be understood that the terms "comprise" or variations such as "comprises" or "comprising", "include" or variations such as "includes" or "including", "contain" or variations such as "contains" and "containing", "characterized by" or variations such as "characterizing by", "have" or variations such as "has" or "having", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that the term "a" used in the description and claims could mean "one" or could mean "at least one."

Use of "at least one" in the description and claims is not intended nor used in this disclosure to mean that other claims or descriptions not incorporating the "at least one" language cannot further include one or more like elements and the language "at least one" is not intended nor used to change "open-ended" claims, inherently including devices or methods having additional elements or steps apart from those claimed, into "closed-ended" claims wherein devices or methods having additional elements would not be covered by such claims. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 9 or any other claim" or the like, it could be re-drafted as dependent on claim 1, claim 8, or even claim 11 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the various embodiments of the application, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A barrier for controlling access comprising:

a body, an arm, an actuator, a power source which is not connected to mains power, a controller, and a battery, wherein the power source is adapted to charge the battery, the battery is adapted to supply power to the actuator, and the controller is connected to the battery, wherein the controller is configured to instruct the actuator to move the arm reversibly between closed and open positions, and wherein the controller is configured to monitor the power consumption of the actuator, monitor the position of the arm, and adjust the amount of power provided by the battery to the actuator based on the position of the arm.

2. A barrier according to claim 1 wherein the controller has a standby power consumption of less than 1 watt.

3. A barrier according to claim 1 wherein the power source is a renewable power source.

4. A barrier according to claim 1 wherein the power source comprises a photovoltaic device or a wind turbine.

5. A barrier according to claim 1 wherein, to move between its open and closed positions, the arm pivots around a pivot point which is adjacent to an end of the arm, and wherein the controller is configured to reduce power supplied to the actuator as the arm moves from the open position, in which the arm is generally vertical relative to the body, to the closed position, in which the arm is generally horizontal relative to the body.

6. A barrier according to claim 5 wherein the controller is configured to reduce the power supplied to the actuator as the arm moves from an angular position within the range between about 90 to about 80° into an angular position in the range between about 80 to about 0°, wherein an angular position of about 90° corresponds to a vertical orientation of the arm relative to the body and an angular position of about 0° corresponds to a horizontal orientation of the arm relative to the body.

7. A barrier according to claim 1 wherein the actuator comprises a transmission mechanism which actuates the arm such that acceleration and deceleration of the arm as it moves between open and closed positions and vice versa is generally sinusoidal.

8. A barrier according to claim 7, wherein the actuator further comprises a rotary motor and the transmission mechanism comprises:

a lever which is coupled to the rotary motor, and a drive member which is attached to the arm, wherein the lever and the drive member are coupled such that when the motor rotates, the lever follows a rotary motion associated with the motor and drives the drive member in a rotary motion, and wherein the rotary motion of the lever and the rotary motion of the drive member are out of phase with one another.

9. A barrier according to claim 1 wherein to move between the open and closed positions, the arm pivots around a pivot point which is adjacent to an end of the arm, wherein in the open position the arm is orientated generally vertically relative to the body, and in the closed position the arm is orientated generally horizontally relative to the body, and wherein the barrier further comprises a compensator which is coupled to the arm such that when the arm is moved between the open and closed positions and vice versa, the compensator exerts a force on the arm which counteracts the force of gravity.

10. A barrier according to claim 9 wherein the compensator is a spring.

11. A barrier according to claim 1 further comprising a secondary power source.

12. A barrier according to claim 11 wherein the secondary power source comprises a generator or a mains connection.

13. A barrier according to claim 11 wherein the power source and the secondary power source are adapted to charge the battery and the battery is adapted to supply power to the actuator, and wherein the controller is configured such that the secondary power source only charges the battery when the battery is below a charge threshold.

14. A barrier according to claim 1 wherein the barrier further comprises a secondary body and wherein each of the body and the secondary body are provided with a detector unit, which detector units are adapted to communicate with one another and send an instruction to the controller.

15. A barrier according to claim 14 wherein the communication between the detector units is wireless.

16. A barrier according to claim 14 wherein the secondary body is provided with a renewable power source to power the detector unit which is provided on the secondary body.

17. A barrier according to claim 14 wherein the secondary body is provided with a support for a distal end of the arm which is adapted to support the arm in its closed position.

18. A barrier according to claim 1 wherein the arm is configured to move vertically between the closed and open positions.

* * * * *